A. N. NEWTON.

Breech-Loading Fire-Arm.

No. 157. A. I. Patented Dec. 23, 1856

N. PETERS, PHOTO-LITHOGRAPHER, WASHINGTON, D. C.

UNITED STATES PATENT OFFICE.

ABNER N. NEWTON, OF RICHMOND, INDIANA.

IMPROVEMENT IN BREECH-LOADING FIRE-ARMS.

Specification forming part of Letters Patent No. 11,198, dated June 27, 1854; Additional Improvement No. 145, dated June 17, 1856; Additional Improvement No. 157, dated December 23, 1856.

*To all whom it may concern:*

Be it known that I, ABNER N. NEWTON, of Richmond, in the county of Wayne and State of Indiana, have invented new and useful Improvements in Breech-Loading Fire-Arms; and I do hereby declare that the following is a full, clear, and exact description of the construction and operation of the same, reference being had to the annexed drawings, making a part of this specification, in which—

Figure 1S:
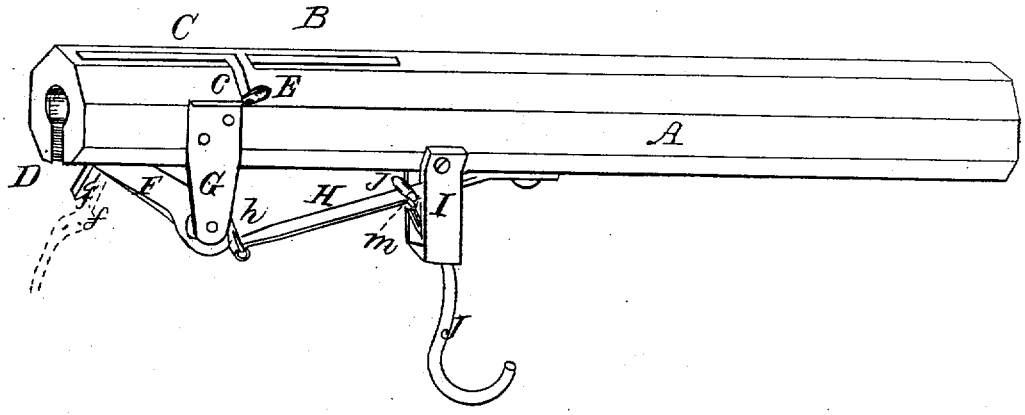
Figure 2N:
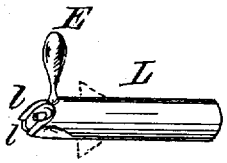
Figure 3R:
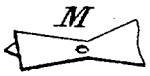

Figure 1 is a perspective view of my invention. Fig. 2 shows the breech-pin with lips *l l* in the rear. Fig. 3 is the spring in the bottom of receiving-chamber.

The barrel A is of the ordinary form, with mortises B D and slots C *c* in the rear. Mortise B, as in my former improvement, is for the reception of the cartridge. Slots C *c* at the rear of mortise B allow of free passage of lever E.

D is a mortise immediately beneath slot C.

E is a lever connected with the rear of breech-pin L at right angles, by means of which it receives its rotary and horizontal motions.

F is the hammer, permanently fixed upon an arbor playing in supports G.

H is the mainspring, attached to the under side of the barrel by a screw, or in other manner sufficiently firm. It is connected by link *h* to the hammer F.

I is a support to tension-lever J.

J is a tension-lever or trigger. Its lower end may have any of the known forms for such contrivances. In its upper end is mortise *j*, which slides upon mainspring H. This contrivance answers a threefold purpose. When lever J is drawn toward the breech of the gun, the portion above mortise *j* is forced forward between the spring and barrel, thereby producing the necessary tension of the spring; but when J is now moved in the opposite direction, the spring is first relieved of tension. If the motion of lever J be continued in the same direction, the portion below mortise *j* is forced against the under side of the spring, producing counter-tension, and thereby cocking the gun. The gun may also be cocked by forcing backward the breech-pin L, the rear end of which drives the hammer backward and downward to the cock.

L is a cylindrical breech-pin, as shown in my patent of August 12, 1856. At its rear are two projections or lips, *l l*.

*l l* are two lips to prevent the premature discharge while locking the breech-pin. They project a few lines beyond the percussion-needle, so as completely to shield it from a blow of the hammer until the pin is locked by rotation. These lips have inclined surfaces on their alternate sides, so as to lift the hammer in the process of unlocking.

*m* is the part of J above the mortise *j*.

M is a spring placed in the bottom of the receiving-chamber to lift the cartridge upon a line with the bore of the gun. It is pressed down and allows the breech-pin to pass in forcing in the charge.

All parts not herein delineated will be found described in my other applications.

Parts of the original patent and improvement may be interchanged with this—viz., the hammer playing loosely upon an arbor may be substituted; also, the combination of hammer, mainspring, tumbler and feather-spring may be used instead of the present arrangement.

Operation: Immediately after firing, the gun is taken in the left hand, and the breech-pin is unlocked and slid back by the lever E, thereby cocking the gun. The cartridge is now dropped in and forced home by a forward movement of the lever E in connection with the breech-pin. The gun is now loaded and cocked ready for firing. It may now be fired by a touch of the trigger. If, however, it is not desirable to fire immediately, the tension of the mainspring may be relaxed by a forward movement of tension-lever J, leaving the gun on the cock, in which condition it may be carried with perfect safety as long as desirable. Now, by a backward movement of lever J all is in readiness for firing; or, immediately after firing, the tension of the mainspring may first be relaxed and the gun cocked by a movement of lever J. The remainder of the operation may be effected as before described.

Now, what I claim as my invention, and desire to secure by Letters Patent, is—

1. The combination of lever E with the breech-pin, substantially in the manner and for the purposes herein set forth.

2. One or more lips, *l*, in combination with the breech-pin, substantially as described.

3. Cocking the gun by the backward movement of the breech-pin, as set forth.

4. Cocking the gun by the tension-lever J, as herein described.

5. Forcing the part *m* or its equivalent between the mainspring and barrel for the purpose of imparting tension to the mainspring.

6. Relaxing the mainspring by removing the part *m*.

7. Attaching the mainspring H to the barrel.

8. The combination of the hammer F with the barrel by means of supports G, as delineated.

9. Sliding the breech-pin L wholly within the barrel, as shown.

ABNER N. NEWTON.

Attest:
GEO. TAYLOR,
JOHN FINLEY.